US009817129B2

(12) United States Patent
Hansen, Jr. et al.

(10) Patent No.: US 9,817,129 B2
(45) Date of Patent: Nov. 14, 2017

(54) MONITOR BASED AMBIGUITY VERIFICATION FOR ENHANCED GUIDANCE QUALITY

(71) Applicant: SIERRA NEVADA CORPORATION, Sparks, NV (US)

(72) Inventors: Joseph Henry Hansen, Jr., Kaysville, UT (US); William Gerald Wright, Sandy, UT (US)

(73) Assignee: Sierra Nevada Corporation, Sparks, NV (US)

( * ) Notice: Subject to any disclaimer, the term of this patent is extended or adjusted under 35 U.S.C. 154(b) by 499 days.

(21) Appl. No.: 14/507,545

(22) Filed: Oct. 6, 2014

(65) Prior Publication Data

US 2016/0097859 A1  Apr. 7, 2016

(51) Int. Cl.
| | |
|---|---|
| *G01S 19/44* | (2010.01) |
| *G01S 19/43* | (2010.01) |
| *G01S 19/04* | (2010.01) |
| G01S 19/03 | (2010.01) |
| G01S 19/46 | (2010.01) |
| G01S 19/07 | (2010.01) |

(52) U.S. Cl.
CPC .............. *G01S 19/44* (2013.01); *G01S 19/04* (2013.01); *G01S 19/43* (2013.01); *G01S 19/03* (2013.01); *G01S 19/07* (2013.01); *G01S 19/46* (2013.01)

(58) Field of Classification Search
CPC .......... G01S 19/03; G01S 19/04; G01S 19/07; G01S 19/09; G01S 19/43; G01S 19/44
USPC ............. 342/357.26, 357.27, 357.44, 357.46
See application file for complete search history.

(56) References Cited

U.S. PATENT DOCUMENTS

| | | | |
|---|---|---|---|
| 5,991,691 A | 11/1999 | Johnson | |
| 6,127,968 A | 10/2000 | Lu | |
| 6,424,914 B1 | 7/2002 | Lin | |
| 7,026,982 B2 * | 4/2006 | Toda | G01S 19/55 342/357.27 |
| 7,071,870 B2 * | 7/2006 | Sharpe | G01S 19/44 342/357.31 |
| 7,511,661 B2 * | 3/2009 | Hatch | G01S 19/44 342/357.31 |
| 7,683,832 B2 | 3/2010 | Hansen, Jr. et al. | |
| 8,451,168 B2 * | 5/2013 | Henkel | G01S 19/04 342/357.44 |
| 8,587,475 B2 * | 11/2013 | Leandro | G01S 19/40 342/357.27 |
| 8,694,250 B2 * | 4/2014 | Talbot | G01S 19/04 701/477 |
| 9,146,319 B2 * | 9/2015 | Leandro | G01S 19/04 |

(Continued)

OTHER PUBLICATIONS

International Search Report on corresponding PCT application (PCT/US2015/057239) from International Searching Authority (USPTO) dated Jun. 30, 2016.

(Continued)

*Primary Examiner* — Chuong P Nguyen
(74) *Attorney, Agent, or Firm* — Klein, O'Neill & Singh, LLP

(57) ABSTRACT

Methods and systems useful in determining relative position of moveable vehicle, for example including a GPS receiver, may include determining candidate integer ambiguities in groups, and performing tests to check usefulness of those candidate integer ambiguities.

9 Claims, 7 Drawing Sheets

(56) References Cited

U.S. PATENT DOCUMENTS

| | | | | |
|---|---|---|---|---|
| 2008/0297408 A1* | 12/2008 | Dai | ............. | G01S 19/55 |
| | | | | 342/357.38 |
| 2009/0027264 A1* | 1/2009 | Chen | ............. | G01S 19/04 |
| | | | | 342/357.27 |
| 2010/0214161 A1 | 8/2010 | Talbot et al. | | |
| 2011/0140959 A1* | 6/2011 | Vollath | ............. | G01S 19/44 |
| | | | | 342/357.27 |
| 2011/0181462 A1* | 7/2011 | Lawrence | ............. | G01S 19/44 |
| | | | | 342/357.26 |
| 2012/0154210 A1 | 6/2012 | Landau et al. | | |
| 2012/0286991 A1 | 11/2012 | Chen et al. | | |
| 2014/0240172 A1* | 8/2014 | Milyutin | ............. | G01S 19/20 |
| | | | | 342/357.51 |

OTHER PUBLICATIONS

Written Opinion on corresponding PCT application (PCT/ US2015/ 057239) from International Searching Authority (USPTO) dated Jun. 30, 2016.

Wang et al.; "Rover Autonomous Integrity Monitoring of GNSS RTK Positioning Solutions with Multi-Constellations"; Proceedings of the $22^{nd}$ International Technical Meeting of the Satellite Division of the Institute of Navigation; Sep. 22-25, 2009; Savannah International Convention Center, Savannah, Georgia; http://eprints.gut.edu.au/31007/1/c31007.pdf.

* cited by examiner

MONITOR BASED AMBIGUITY VERIFICATION FOR ENHANCED GUIDANCE QUALITY

BACKGROUND

The present invention relates generally to GPS position determination, and more particularly to GPS ambiguity estimation and verification.

Global Positioning System (GPS) satellites transmit signals that can be processed to determine position. In general, GPS satellites transmit signals including information relating to time of transmission and position of transmission, with the signals being transmitted about two different frequencies. Use of the information by a receiver allows the receiver to determine a pseudo range measurement to the transmitting satellite.

More precise range measurements may be derived by tracking phase of the signals received by the receiver. Measurement of phase, however, may provide ambiguous results. The ambiguities may be estimated, with the estimated ambiguities used in providing relatively precise position information for the receiver.

Unfortunately, the estimated ambiguities may be incorrect, and they may be incorrect by an amount that is greater than may be allowed for some applications.

SUMMARY

Some aspects of the invention provide a method, performed by circuitry, of determining integer ambiguities for relative position determination using satellite provided data, comprising: receiving satellite data relating to position; performing measurement processing to obtain float ambiguity estimates; determining groups of candidate integer ambiguities, each of the groups including candidate integer ambiguity for a plurality of receivers and satellites; for each of the groups, determining whether the candidate integer ambiguities for the group exhibits a statistical distribution consistent with low noise phase measurements; and selecting, from among the candidate integer ambiguities which exhibit the statistical distribution consistent with low noise phase measurements, a candidate integer ambiguity for use in determining relative position.

Some aspects of the invention provide a method, performed by circuitry in a mobile vehicle, useful in determining relative position of mobile vehicle having a receiver, using information from a plurality of satellites and a plurality of base receivers, comprising: receiving position related information from a plurality of satellites; receiving further position related information from each of the plurality of base receivers; determining double-differenced widelane float ambiguity estimates, and their associated covariance matrices, for a plurality of pairs, each pair including the mobile vehicle and a different base receiver based on the position related information and the further position related information; determining groups of candidate widelane integer ambiguities and their associated covariance matrices, each of the groups being for a receiver of interest and a satellite of interest, each group including candidate widelane integer ambiguities for the receiver of interest and each of the plurality of satellites, including the satellite of interest, and candidate widelane integer ambiguities for at least some other receivers and the satellite of interest; performing a first test to determine, for at least one group, on a mobile vehicle/base receiver pair basis for the plurality of satellites, if the candidate widelane integer ambiguities exhibit a statistical distribution consistent with low noise phase measurements; performing a second test to determine, for at least one group, on a single satellite basis for a plurality of mobile vehicle/base receiver pairs, if the candidate widelane integer ambiguities exhibit a statistical distribution consistent with low noise phase measurements; and selecting, from among the candidate widelane integer ambiguities, a widelane integer ambiguity for use in determining relative position of the mobile vehicle.

Some aspects of the invention provide a system for determining relative position of a rover, comprising: a data link; a global positioning system (GPS) receiver; a processor coupled to the data link and GPS receiver, the processor configured by program instructions, to: determine double differenced float ambiguity estimates and a float ambiguity covariance matrix based on information from the GPS receiver and information from other GPS receivers received by way of the data link; determine groups of integer ambiguity estimates and their covariance matrices; perform a first test to determine for each group, on a pairs of the GPS receivers basis for satellites in view of those GPS receivers, if the integer ambiguity estimates exhibit a statistical distribution consistent with low noise phase measurements; perform a second test to determine for each group, on a single satellite basis for pairs of GPS receiver, if the integer ambiguity estimates exhibit a statistical distribution consistent with low noise phase measurements; and select a one of the integer ambiguity estimates that has passed both the first test and the second test for use in navigation position functions.

These and other aspects of the invention are more fully comprehended upon review of this disclosure.

DETAILED DESCRIPTION

Figure 1:
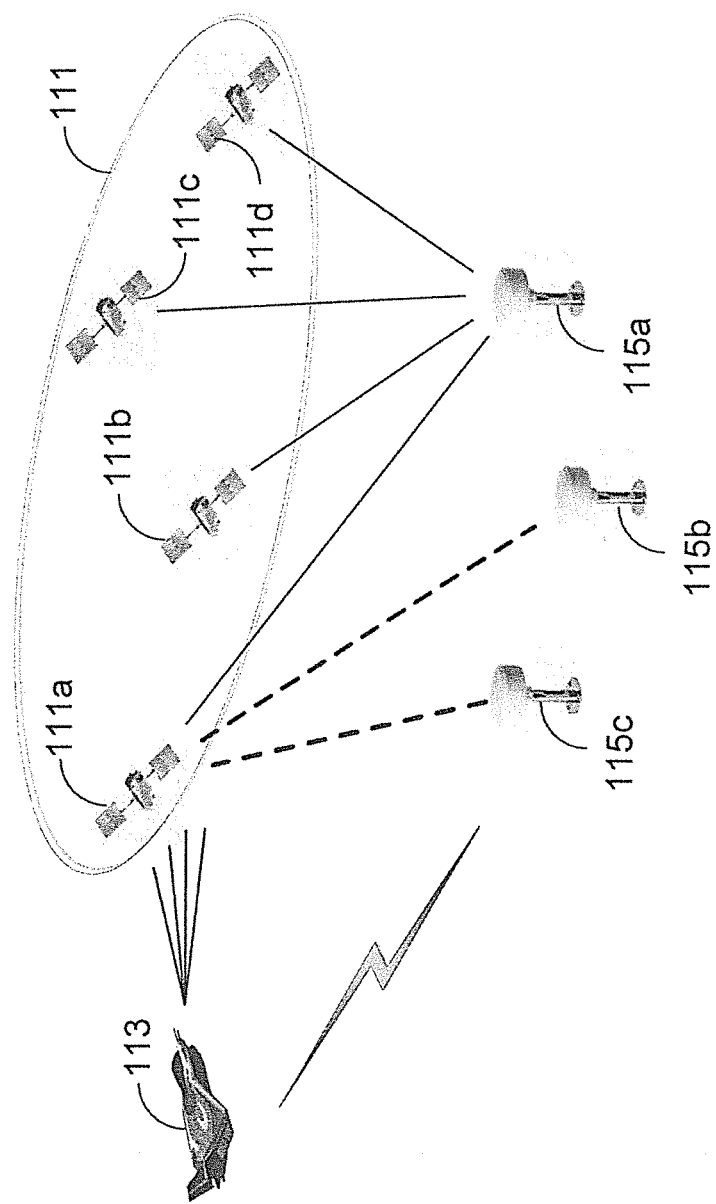
FIG. 1 illustrates an operational setup in which systems and methods in accordance with aspects of the invention may be used.

FIG. 1 illustrates an operational setup in which systems and methods in accordance with aspects of the invention may be used. In FIG. 1, a set of GPS satellites 111 are in view of a rover 113 and a plurality of base receivers 115a-c. The satellites may include four satellites 111a-d. In the discussion that follows, for particular determinations a one of the satellites, for example satellite 111a, may be considered a satellite of interest. The rover may be, for example, an airborne vehicle, and the base receivers may have fixed positions or may be moveable, and for example may be seaborne ships. As with the satellites, in the discussion that follows, for particular determinations a one of the base receivers, for example base receiver 115a, may be considered a base receiver of interest. In various embodiments, relative position of the rover with respect to the base receiver may be of interest.

Figure 2:
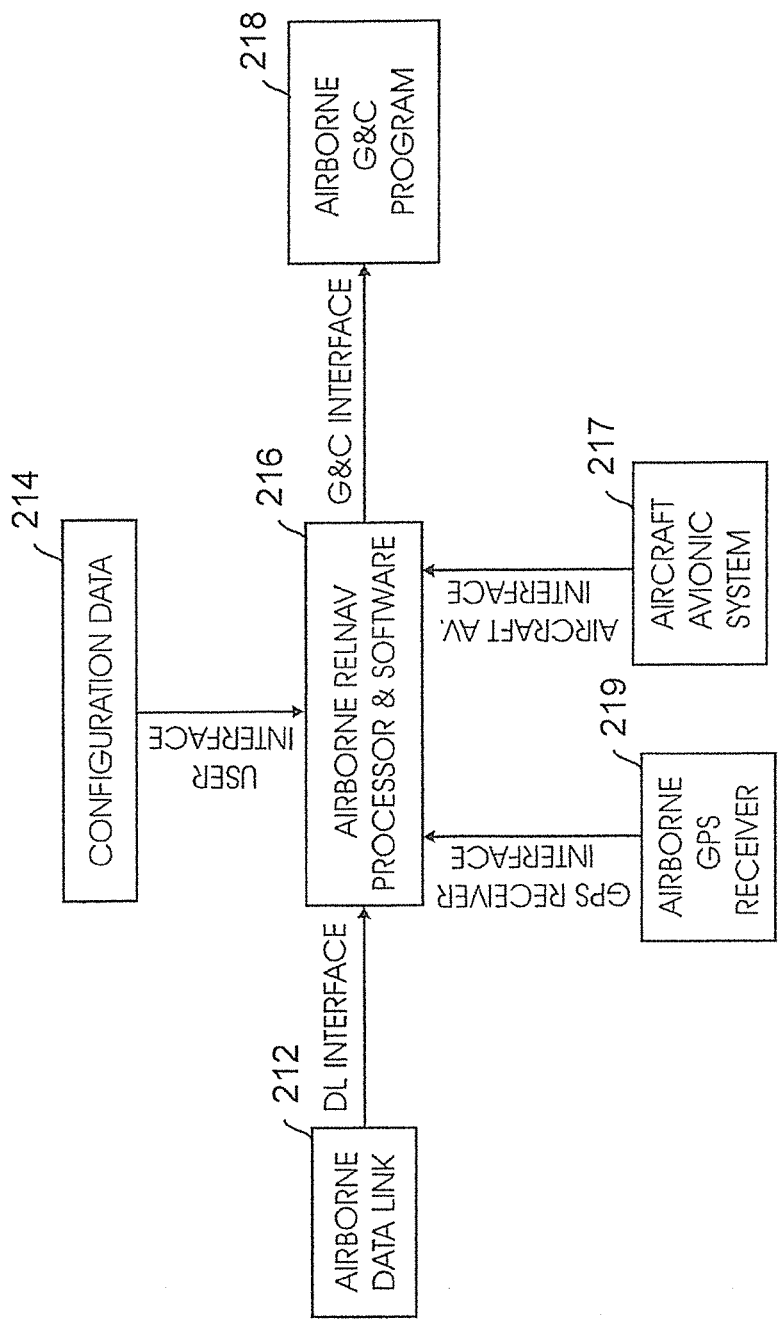
FIG. 2 is a block diagram of an Airborne Relative State System.

FIG. 2 is a block diagram of an Airborne Relative State System, which for example may be in the rover of FIG. 1. The Airborne Relative State System includes an Airborne RelNav computer system 216. The Airborne RelNav computer system receives information from a GPS receiver 219 and from a data link 212. The GPS receiver is generally carried by the rover, and the data link will generally provide GPS related information from other GPS receivers, for example those of the base receivers of FIG. 1. The Airborne RelNav computer system may also receive configuration data 214, for example by way of a user interface, and information, over an aircraft avionic systems interface 217, from various aircraft avionic systems. In many embodiments the Airborne RelNav computer system computes a relative position and velocity vector between the rover and a base receiver of interest, for example a ship. The Airborne RelNav computer system may also compute an uncertainty of the computed position and velocity vectors. The computed relative state and its uncertainty are provided to a guidance and control (G&C) system 218, for example for guidance and control of the rover.

The Airborne RelNav computer system utilizes determined widelane and/or single frequency (single lane or SF) integer ambiguities, which may be in the form of a phase measurement vector incorporating the determined integer ambiguities, in determining relative position between the rover and the base receiver of interest. In various embodiments the Airborne RelNav computer system also performs calculations to determine probabilities that the determined integer ambiguities are correct. In some embodiments the Airborne RelNav computer system performs one or more tests on determined integer ambiguities to determine if validity of the determined integer ambiguities are sufficiently certain so as to allow for use of the determined integer ambiguities in determining relative position. In some embodiments, in doing so the Airborne RelNav computer system performs a residual test on the determined integer ambiguities. In some embodiments the residual test measures consistency between measurements from a plurality of satellites for a single rover/base receiver pair. In some embodiments, in doing so the Airborne RelNav computer system performs a range test on the determined integer ambiguities. In some embodiments the range test measures consistency between measurements from a single satellite for a plurality of rover/base receiver pairs. In some embodiments, in doing so the Airborne RelNav computer system performs both a residual test and a range test on the determined integer ambiguities. In some embodiments the Airborne RelNav computer system performs at least two tests on the determined integer ambiguities, with the two tests, for example a residual test and a range test, decorrelated from one another.

Figure 3:
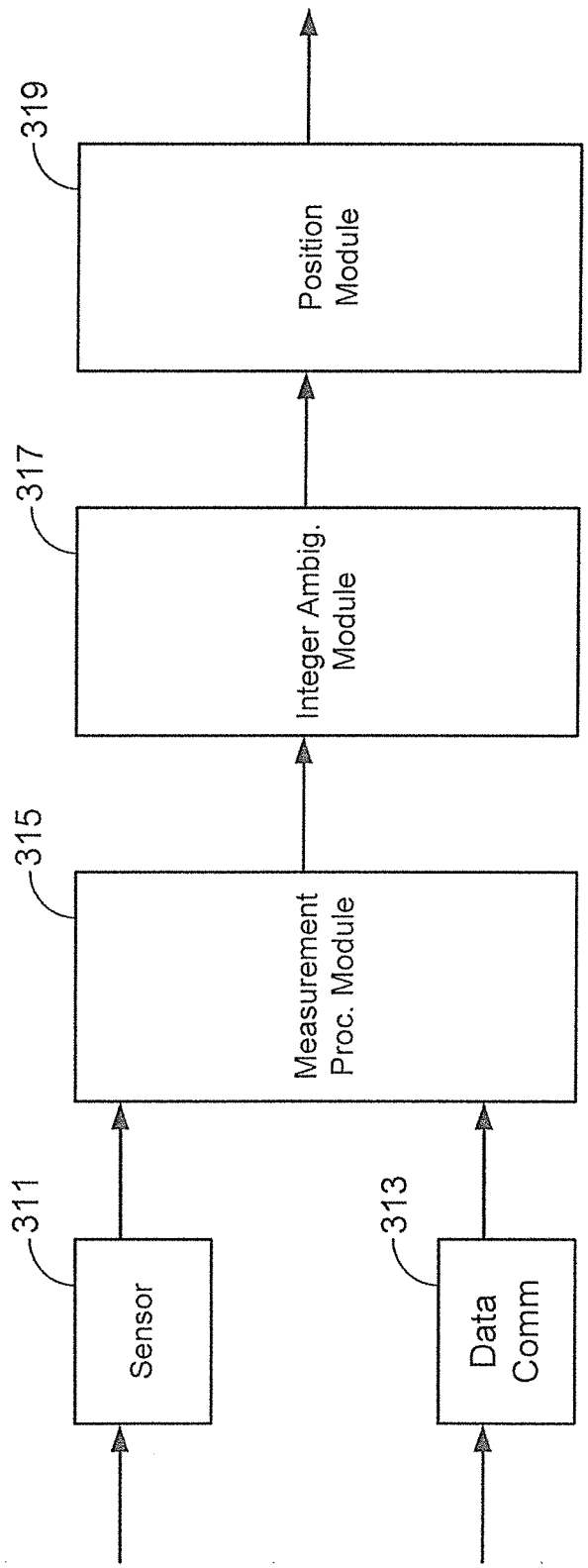
FIG. 3 is a block diagram, or portions of a block diagram, of a relative navigation block in accordance with aspects of the invention.

FIG. 3 is a block diagram, or portions of a block diagram, of a relative navigation block in accordance with aspects of the invention. The blocks and modules of the relative navigation block may be implemented in circuitry or, in various embodiments, a combination of circuitry, which may include circuitry in the form of one or more processors, and program instructions configuring the processors. The relative navigation block includes a Measurement Processing module 315. The Measurement Processing module 315 receives measurement information from the rover (R) and a plurality of base receivers. For purposes of discussion, three base receivers (B1, B2, B3) will be used for purposes of example. The Measurement Processing module, using the measurement information, determines widelane (WL), single frequency (SF) L1, and L2 double differenced (DD) phase measurement vectors, along with their associated covariance matrices. The Measurement Processing module also determines DD WL float ambiguities and its covariance matrix.

The measurement information are first processed individually, from each source and un-differenced, before forming single-differenced (SD) and double-differenced (DD) measurements. Details of an example of measurement processing may be found, for example, in Dogra Surjan, Sea-Based JPALS Relative Navigation Algorithm Development, Proceedings of the 18th International Technical Meeting of the Satellite Division of The Institute of Navigation (ION GNSS 2005) Sep. 13-16, 2005, the disclosure of which is incorporated for all purposes herein.

Generally, un-differenced (UD) processing includes, for each base receiver (B1, B2, and B3) and each satellite, translating the measurements to a common reference point, and forming L1, L2, widelane phase measurements, and L1, L2, single frequency code measurements along with their covariance matrices. Floating point (float) widelane ambiguities, along with their covariance are also estimated.

The single difference processing takes the difference in UD measurements for all Rover-Base pairs, on a per satellite basis. Accordingly, for each satellite, and for each of the single frequency L1 and L2 frequencies, the SD code and phase measurements are formed for each Rover-Base receiver pair (3 pairs), along with their covariance matrices. The SD code and phase measurements from each Rover-Base pair are combined, and the corresponding covariance matrices are calculated. The SD float widelane ambiguities are also calculated for each Rover-Base receiver pair (3 pairs), along with their covariance, and the SD float widelane ambiguities from each Rover-Base pair are combined, with the corresponding covariances calculated.

In double-differenced (DD) processing, the difference in SD measurements is calculated between each satellite and a key satellite. In addition, for each satellite (other than the key satellite), and for each of the single frequency L1 and L2 frequencies, the DD code and phase measurements are formed, along with their covariance matrices, and for widelane frequency the DD float widelane ambiguity vector is formed, along with its covariance.

If $N_{sat}$ satellites are in view to all receivers, the outputs from the Measurement processing module include $3(N_{sat}-1)$ sets of DD L1, L2 phase measurements and their covariance matrix, and $3(N_{sat}-1)$ sets (which may be referred to as $N_{DD}$ sets) of DD float widelane ambiguities and their covariance matrix.

The Integer Ambiguity Module 317 estimates WL integer ambiguities, determines a probability of correct fix (PCF) for the WL integer ambiguities, and, using the estimated WL integer ambiguities, determines SF integer ambiguities and PCF for the SF integer ambiguities. In some embodiments integer ambiguities are determined using what may be termed a Bootstrapping method, for example as discussed in Teunissen P. J. G., GNSS Ambiguity Bootstrapping: Theory and Application (2001), the disclosure of which is incorporated for all purposes herein. In some embodiments integer ambiguities are determined using ambiguity reordering and sequential conditioning on the DD ambiguity vector and its covariance matrix. In most embodiments the PCFs are determined using two separate checks. In many embodiments the integer ambiguities, and the PCFs, are determined for a satellite/receiver pair of interest through the use of groups of measurements and groups of estimated integer ambiguities.

In some embodiments the Integer Ambiguity Module determines integer ambiguities for a particular receiver of interest and satellite of interest on a group basis. In some embodiments, measurements for each group comprises, and in some embodiments consists of, measurements from a plurality of satellites, generally including the satellite of interest, and the receiver of interest, and measurements from a plurality of other receivers and the satellite of interest. In most embodiments integer ambiguities are determined for each satellite/receiver pair within each group. Accordingly, integer ambiguities for each receiver of interest/satellite of interest pair are calculated for multiple groups, resulting in a plurality of what may be termed integer ambiguity candidates for each receiver of interest/satellite of interest pair.

In some embodiments the Integer Ambiguity Module performs a plurality of decorrelated tests, to determine whether the ambiguities for a group exhibit a statistical distribution consistent with low noise phase measurements. In some embodiments a first of the tests, which may be considered a residual test, determines consistencies on a rover/base receiver pair basis for a plurality of satellites. In some embodiments a second of the tests, which may be considered a range test, determines consistencies across a plurality of rover/base receiver pairs on a single satellite basis.

In some embodiments the Integer Ambiguity Module additionally, for candidate integer ambiguities which have passed the tests, selects, for each receiver of interest/satellite of interest pair, an appropriate candidate as an integer ambiguity for use in position calculations.

The Position Module 319 determines relative position of the rover and a particular reference point, which in some embodiments may be the base receiver of interest. The Position Module determines the relative position using some or all of the integer ambiguities determined by the Integer Ambiguity Module 317. In some embodiments the Position Module determines the relative position as discussed in U.S. Pat. No. 7,683,832, the disclosure of which is incorporated by reference for all purposes herein.

Figure 4:
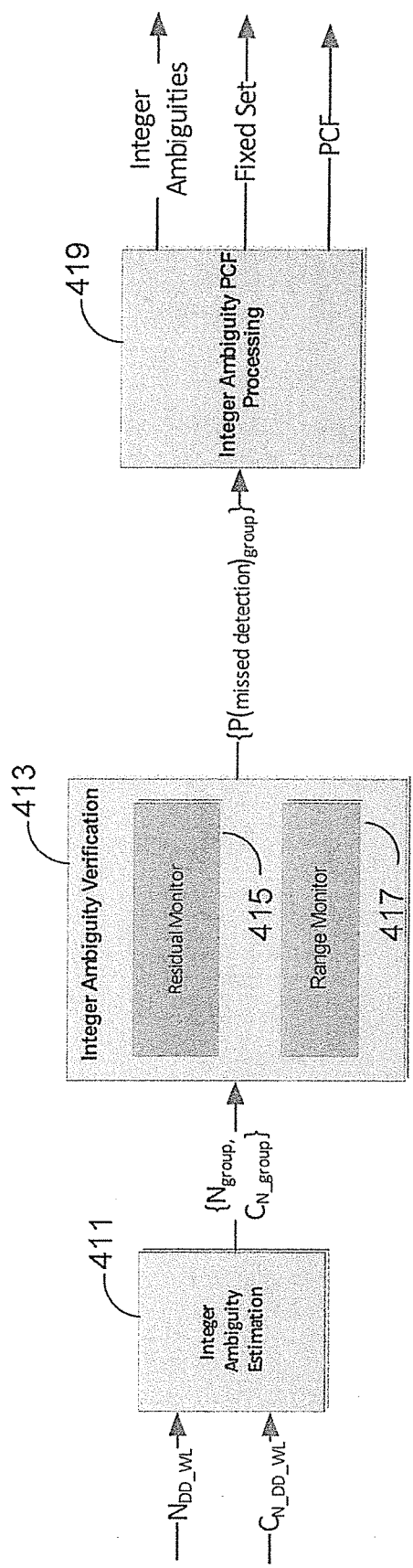
FIG. 4 is a block diagram of an embodiment of an example Integer Ambiguity Module in accordance with aspects of the invention.

FIG. 4 is a block diagram of an embodiment of an example Integer Ambiguity Module. The blocks and modules of the Integer Ambiguity Module may be implemented in circuitry or, in various embodiments, a combination of circuitry, which may include circuitry in the form of one or more processors, and program instructions configuring the processors. The block diagram of FIG. 4 is shown, for simplicity, for operating on widelane ambiguities. In some embodiments, the widelane integer ambiguities are used in determining single frequency ambiguities, and one would understand that in some embodiments widelane integer ambiguities are first determined for use, and then those determined widelane integer ambiguities are used for operations relating to single frequency integer ambiguity processing.

In some embodiments, integer ambiguities are calculated for each group in block 411. The objective of each group is to determine whether the integer ambiguity of the measurement of interest (from the SOI/ROI pair) was determined properly. Groups include measurements from 3 other satellites as well as redundant measurements from other receivers, so that various checks can be performed on the consistency of the solution. It should be noted that each satellite/receiver pair will be present in $$\binom{N_{DD}-1}{3}$$

groups, so numerous candidate integer ambiguities will be generated for each DD measurement.

The ambiguity verification block 413 performs fault detection checks using the candidate integer ambiguities to detect erroneous candidates. In some embodiments, and as illustrated in FIG. 4, the fault detection checks include, and in some embodiments consist of, a residual check and a range check. The residual check may be performed, for example, by a residual monitor sub-block 415 and the range check may be performed, for example, by a range sub-block 417. For the integer ambiguity candidates that pass all fault checks, a probability of missed detection is computed. Each DD measurement is likely to still have multiple fault-free integer ambiguity candidates after this verification process, each with different probabilities of missed detection.

The Ambiguity Probability of Correct Fix (PCF) Processing block 419 takes the set of fault-free ambiguity candidates along with their probability of missed detection, and for each satellite/receiver pair selects the most appropriate ambiguity value, the ambiguity value with the highest probability of correct fix in most embodiments. As many satellite/receiver pairs are added to the fixed set as is possible without exceeding the allocated PIF.

The measurements from the fixed set will have their DD integer ambiguity fixed, and will be used along with the other measurements (DD float ambiguities) to compute a precision relative navigation solution.

Figure 5:
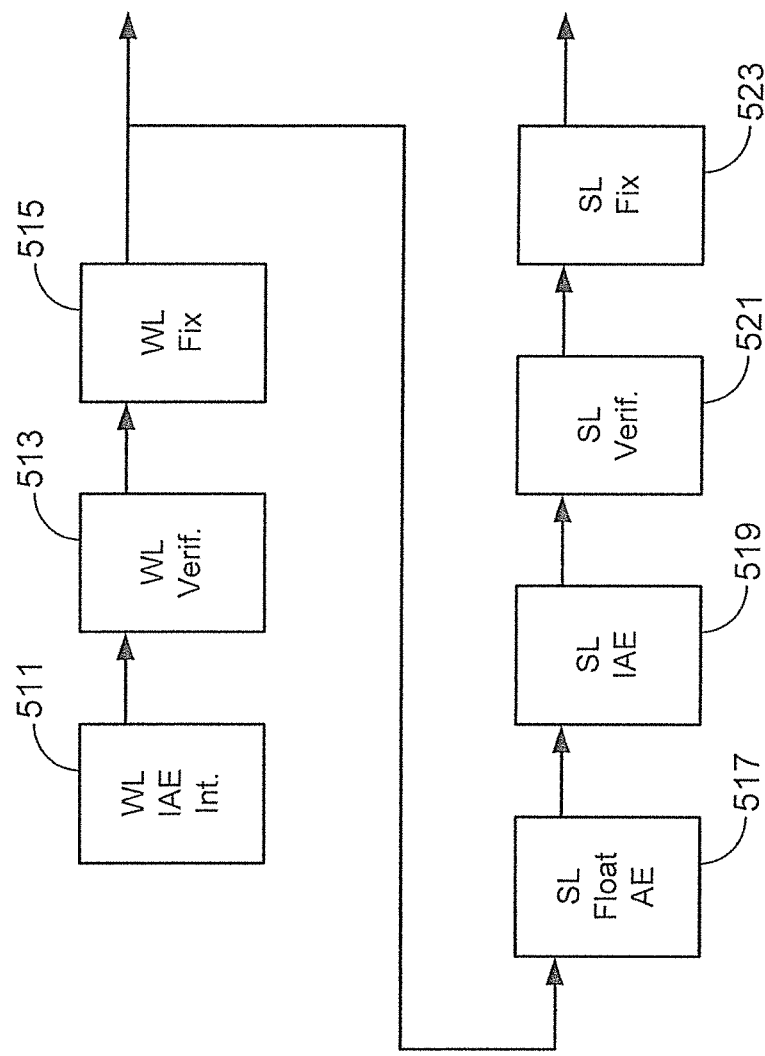
FIG. 5 is a block diagram of a further embodiment of Integer Ambiguity Module in accordance with aspects of the invention.

FIG. 5 is a block diagram of a further embodiment of an Integer Ambiguity Module in accordance with aspects of the invention. As with the block diagram of FIG. 4, the blocks and modules of further embodiment of the Integer Ambiguity Module may be implemented in circuitry or, in various embodiments, a combination of circuitry, which may include circuitry in the form of one or more processors, and program instructions configuring the processors.

The Integer Ambiguity Module includes a widelane integer ambiguity estimation block 511, a widelane integer ambiguity verification block 513, and a widelane probability of correct fix block 515 for performing operations relating to widelane integer ambiguities. The Integer Ambiguity Module also includes a single frequency float ambiguity estimation block 517, a single frequency integer ambiguity estimation block 519, a single frequency integer ambiguity verification block 521, and a single frequency probability of correct fix block 523. In some embodiments the single frequency related blocks are in operation only when particularly precise positioning information is desired.

The widelane integer ambiguity estimation block 511 determines widelane candidate integer ambiguities, which may be incorporated into candidate phase measurement vectors. The widelane integer ambiguity verification block 513 performs tests on, effectively, the candidate widelane integer ambiguities, including in some embodiments determining probabilities of missed detection (PMD) for those candidates. In some embodiments at least two decorrelated tests are performed on the candidate integer ambiguities. In some such embodiments the two tests include a test which measures consistency between measurements from a plurality of satellites for a single rover/base receiver pair, and a test which measures consistency between measurements from a single satellite for a plurality of rover/base receiver pairs. The widelane probability of correct fix block 515 selects widelane integer ambiguities for use in determining relative position.

The single frequency float ambiguity estimation block 517 determines single frequency float ambiguities using the determined widelane integer ambiguities. The single frequency integer ambiguity estimation block 519 determines single frequency candidate integer ambiguities, for example in the same manner as the widelane integer ambiguity estimation block. The single frequency integer ambiguity verification block 521 performs tests on, effectively, the candidate single frequency integer ambiguities, including in some embodiments determining probabilities of missed detection (PMD) for those candidates. As with the widelane processing, in some embodiments at least two decorrelated tests are performed on the candidate integer ambiguities. Also as with the widelane processing, in some such embodiments the two tests include a test which measures consistency between measurements from a plurality of satellites for a single rover/base receiver pair, and a test which measures consistency between measurements from a single satellite for a plurality of rover/base receiver pairs. The single frequency probability of correct fix block 523 selects single frequency integer ambiguities for use in determining relative position.

In some embodiments, the widelane integer ambiguity estimation block 511 utilizes DD float ambiguities to determine candidate integer ambiguities and candidate fixed measurement vectors. In some embodiments, sets of satellites in view of all receivers are determined, each set is paired with each base receiver to form a combination, for each combination groups are formed by designating each satellite in the combination as a satellite of interest, and integer ambiguities (and the associated covariance matrix) are determined. Using the integer ambiguities, candidate fixed DD WL phase measurements are determined. In some embodiments the widelane integer ambiguity estimation block forms groups characterized by a satellite/base receiver pair. Forming such groups may be accomplished by enumerating every set of 4 satellites in view of all receivers (there are $$\binom{N_{DD}}{4}$$

such sets), forming combinations by pairing each set with each base receiver (there are 3

$$\binom{N_{DD}}{4}$$

such combinations), and denoting the corresponding base receiver as the Receiver of Interest (ROI) for the combination. Groups may be formed by designating a satellite in the combination as Satellite of Interest (SOI) (depending on GPS constellation state, there may be 11

$$\binom{N_{DD}}{4}$$

such groups). Each group is therefore characterized by a satellite/Base receiver pair specified respectively as the SOI and ROI.

For each group g, the DD integer WL ambiguities may be determined by forming $\hat{N}_g$, the group's 6-by-1 vector of DD float WL ambiguities, using the 4 DD float ambiguities from the combination (e.g. from the ROI) and the other 2 for the SOI from the other two receivers (from $\hat{N}_{DD\_WL}$), forming $C_{\hat{N}_g}$, the associated 6-by-6 covariance matrix (from $$C_{\hat{N}_{DD\_WL}}),$$

and solving for $\hat{N}_g^{int}$, the 6-by-1 vector of DD integer WL ambiguities and associated 6-by-6 covariance matrix using the Bootstrapping algorithm. The candidate fixed DD WL phase measurements may then be determined.

In some embodiments $C_{\hat{N}_g}$ is determined according to $$C_{\hat{N}_g} = \begin{bmatrix} C_{N_r} & C_{N_r N_c} \\ C_{N_r N_c}^T & C_{N_c} \end{bmatrix}$$

Where $C_{N_c}$ is the covariance matrix for the 4 float ambiguities of the satellites in the current combination on the ROI. In some embodiments $$C_{N_c} = \begin{bmatrix} \sigma^2_{N_{DD\_WL,4,1\_sd}} + \sigma^2_{N_{DD\_WL,k,1\_sd}} & \sigma^2_{N_{DD\_WL,k\_sd}} & \sigma^2_{N_{DD\_WL,k\_sd}} & \sigma^2_{N_{DD\_WL,k\_sd}} \\ \sigma^2_{N_{DD\_WL,k\_sd}} & \sigma^2_{N_{DD\_WL,3,1\_sd}} + \sigma^2_{N_{DD\_WL,k,1\_sd}} & \sigma^2_{N_{DD\_WL,k\_sd}} & \sigma^2_{N_{DD\_WL,k\_sd}} \\ \sigma^2_{N_{DD\_WL,k\_sd}} & \sigma^2_{N_{DD\_WL,k\_sd}} & \sigma^2_{N_{DD\_WL,2,1\_sd}} + \sigma^2_{N_{DD\_WL,k,1\_sd}} & \sigma^2_{N_{DD\_WL,k\_sd}} \\ \sigma^2_{N_{DD\_WL,k\_sd}} & \sigma^2_{N_{DD\_WL,k\_sd}} & \sigma^2_{N_{DD\_WL,k\_sd}} & \sigma^2_{N_{DD\_WL,i,1\_sd}} + \sigma^2_{N_{DD\_WL,k,1\_sd}} \end{bmatrix}$$

$C_{N_r}$ is the covariance matrix for the up to 2 redundant receivers float ambiguities. In some embodiments $$C_{N_r} = \begin{bmatrix} \sigma^2_{N_{DD\_WL,i,3\_sd}} + \sigma^2_{N_{DD\_WL,k,3\_sd}} & \sigma^2_{N_{DD\_WL,OD_x}} \\ \sigma^2_{N_{DD\_WL,OD_x}} & \sigma^2_{N_{DD\_WL,i,2\_sd}} + \sigma^2_{N_{DD\_WL,k,2\_sd}} \end{bmatrix}$$

$$C_{N_r N_c} = \begin{bmatrix} \sigma^2_{N_{DD\_WL,OD_x}} & \sigma^2_{N_{DD\_WL,OD_x}} & \sigma^2_{N_{DD\_WL,OD_x}} & \sigma^2_{N_{DD\_WL,OD_x}} \\ \sigma^2_{N_{DD\_WL,OD_x}} & \sigma^2_{N_{DD\_WL,OD_x}} & \sigma^2_{N_{DD\_WL,OD_x}} & \sigma^2_{N_{DD\_WL,OD_x}} \end{bmatrix}$$

$$\sigma^2_{N_{DD\_WL,OD1}} = \sigma^2_{N_{DD\_WL,i\_b/r}} + \sigma^2_{N_{DD\_WL,k\_b/r}}$$

or 0 if the same rover or base receiver is not used, for i equal to the sensor of interest.

$$\sigma^2_{N_{DD\_WL,OD2}} = \sigma^2_{N_{DD\_WL,k\_b/r}}$$

or 0 if the same rover or base receiver is not used, for i not equal to the sensor of interest.

The variances in the above are those of the WL float ambiguity and were computed earlier.

This process will result in, for example, 11

$$\binom{N_{DD}}{4}$$

sets of 6-by-1 candidate DD integer WL ambiguity vectors and associated covariance matrices. Each satellite/receiver pair will be present in $$\binom{N_{DD}-1}{3}$$

groups, so each measurement will have that many candidate integer i ambiguities.

To determine the DD integer ambiguities, one embodiment uses ambiguity reordering and sequential conditioning on the DD ambiguity vector and its covariance matrix, otherwise known as Bootstrapping. In some embodiments, in performing the Bootstrapping Algorithm, for each group g, an $L^T DL$ decomposition is performed on $C_{\hat{N}_g}$ to obtain the $D_g$ and $L_g$ matrices:

$$D_g = \begin{bmatrix} \sigma^2_{g,6|1:5} & \cdots & 0 \\ \vdots & \ddots & \vdots \\ 0 & \cdots & \sigma^2_{g,1} \end{bmatrix}, L_g^{-T} = [l_{g,6}^{-T}, \ldots, l_{g,1}^{-T}]$$

The ambiguity vector $\hat{N}_g$, its covariance $C_{\hat{N}_g}$, and the $D_g$ and $L_g$ matrices are reordered so that the ambiguity with the smallest initial variance is at the end of the vector elements. Each successive ambiguity is reordered based on the corresponding conditional variance. The re-ordering only includes the measurements from the receiver of interest whereas redundant measurements from other receivers (assumed to be measurements 5 and 6) are not re-ordered.

The integer ambiguity vector of group g, $\hat{N}_g^{int} = [\hat{N}_{g,6|1:5}^{int}, \ldots, \hat{N}_{g,1}^{int}]^T$ is obtained by sequentially rounding the reordered ambiguities as follows:

$$\hat{N}_{g,1}^{int} = [\hat{N}_{g,1}]$$

$$\hat{N}_{g,2|1}^{int} = \left[\hat{N}_{g,2} - \frac{\sigma_{g,1}\sigma_{g,2|1}}{\sigma^2_{g,1}}\left(\hat{N}_{g,1} - \hat{N}_{g,1}^{int}\right)\right]$$

$$\ldots$$

$$\hat{N}_{g,6|1:5}^{int} = \left[\hat{N}_{g,6} - \sum_{i=1}^{5}\frac{\sigma_{g,6}\sigma_{g,m|1:m-1}}{\sigma^2_{g,m|1:m-1}}\left(\hat{N}_{g,i} - \hat{N}_{g,m|1:m-1}^{int}\right)\right]$$

Bootstrapping creates a set of integer ambiguities that are conditionally independent that allows for computation of the probability $P_g(v)$ of error vector v in the ambiguity vector $\hat{N}_g^{int}$ according to:

$$P_g(v) = P_{g,1}(v)P_{g,2|1}(v)P_{g,3|1:2}(v)P_{g,4|1:3}(v)P_{g,5|1:4}(v)P_{g,6|1:5}(v),$$

with, for m<5

$$P_{g,m|1:m-1}(v) = 0.5 \, \text{erf}\left(\frac{1+2l_{g,m}^{-T}v}{2\sigma_{g,m|1:m-1}\sqrt{2}}\right) + 0.5 \, \text{erf}\left(\frac{1-2l_{g,m}^{-T}v}{2\sigma_{g,m|1:m-1}\sqrt{2}}\right)$$

and, for m≥5

$$P_{g,m|1:m-1}(v) =$$
$$\max\left\{0.5 \, \text{erf}\left(\frac{1+2l_{g,m}^{-T}v}{2\sigma_{g,m|1:m-1}\sqrt{2}}\right) + 0.5 \, \text{erf}\left(\frac{1-2l_{g,m}^{-T}v}{2\sigma_{g,m|1:m-1}\sqrt{2}}\right), P_{receiver\ failure}\right\}$$

Once the integer widelane ambiguities are determined for a particular group, a corresponding candidate fixed measurement vector ($\phi_{DD\_WL,g}^{fixed}$) can be formed using the group's subset of 6 DD phase measurements ($\phi_{DD\_WL,g}$) and the candidate integer ambiguities ($\hat{N}_g^{int}$):

$$\phi_{DD\_WL,g}^{fixed} = \phi_{DD\_WL,g} - \lambda_{WL}\hat{N}_g^{int}$$

Without loss of generality, and for convenience of exposition, $\phi_{DD\_WL,g}^{fixed}$ may be set forth as:

$$\phi_{DD\_WL,g}^{fixed} = \begin{bmatrix} \phi_{DD\_WL,g,4a}^{fixed} \\ \phi_{DD\_WL,g,3a}^{fixed} \\ \phi_{DD\_WL,g,2a}^{fixed} \\ \phi_{DD\_WL,g,1a}^{fixed} \\ \phi_{DD\_WL,g,1b}^{fixed} \\ \phi_{DD\_WL,g,1c}^{fixed} \end{bmatrix},$$

where the numbers 1, 2, 3, and 4 represent the group's 4 different satellites and the letters a, b, and c represent the 3 base receivers. For this group, satellite 1 is the SOI, and base receiver a is the ROI.

In some embodiments the widelane integer ambiguity verification block 513 performs a residual test to measure consistency between measurements from satellites for each single rover/base pair, and performs a range test to measure consistency between measurements from the same satellite across multiple rover/base pairs.

In some embodiments the residual test uses a RAIM-like algorithm to identify if an ambiguity is incorrect in each group. The measurements used in the monitor are the 4 DD phase measurements from the group's four satellites, along with the candidate ambiguity fixes. If the ambiguities are fixed correctly on all these measurements, the residual test statistic will exhibit a statistical distribution consistent with low noise phase measurements.

In some embodiments the test statistic uses the Parity space of the group's system matrix $H_g$, composed of the line of sights of the four measurements. The phase residual vector is projected in Parity space, and its magnitude is compared to a threshold that depends on the expected error of fault-free phase measurements. Measurements that fail this test are discarded and no longer considered.

In some embodiments, measurements that pass the test have their probability of missed detection $P(MD_{g,residual}|v)$ evaluated for all error states $v \in V_g$, where $V_g$ is the complete set of valid error states. Certain geometries (captured in $H_g$) will provide better observability into various error states v.

Figure 6:
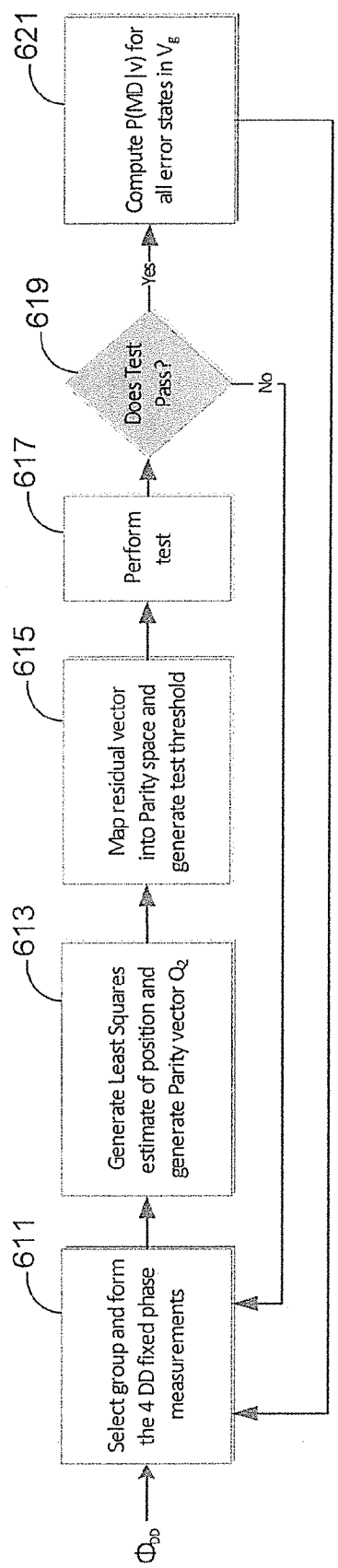
FIG. 6 is a flow diagram of a process that may be used in performing a residual test in accordance with aspects of the invention.

FIG. 6 is a flow diagram of a process that may be used in performing the residual test. In block 611 a group is selected, and DD WL phase measurements for a plurality of satellites and the ROI are formed using candidate ambiguity vector for the group, and a corresponding covariance matrix is also formed. In some embodiments there may be four satellites, with four DD WL phase measurements formed. In block 613 an estimated position is determined, for example using an iterative least-squares method, with the estimated position used to determine phase residuals and line of sight system design matrix H. A QR factorization of H may be performed to obtain an orthonormal matrix $Q_2$. In block 615 $Q_2$ is used to project the phase residuals and their covariance matrix into Parity space. In block 617 the process compares a parity scalar to a predetermined threshold. In block 619 the process determines if the parity scalar is below the predetermined threshold. If not, the process returns to block 611 to process another group. If so, the process, in some embodiments, continues to block 621. In block 621 the process maps an error state into Parity space, and calculates a probability of missed detection. The process thereafter returns to block 611.

In some embodiments, for the residual test the 4 components corresponding to the four satellites on the ROI (receiver a) are selected to form $\tilde{\phi}_{DD\_WL,g}^{fixed}$:

$$\tilde{\phi}_{DD\_WL,g}^{fixed} = \begin{bmatrix} \phi_{DD\_WL,g,1a}^{fixed} \\ \phi_{DD\_WL,g,2a}^{fixed} \\ \phi_{DD\_WL,g,3a}^{fixed} \\ \phi_{DD\_WL,g,4a}^{fixed} \end{bmatrix}$$

The probability of $\hat{N}_g^{int}$ being incorrect may be accounted for during WL Integer Ambiguity PCF processing. Conditioned upon $\hat{N}_g^{int}$ being correct, the covariance matrix of $\tilde{\phi}_{DD\_WL,g}^{fixed}$ is obtained by selecting the appropriate rows and columns from $C_{\phi\_DD\_WL,g}$.

$$\tilde{C}_{\phi\_DD\_WL,g}^{fixed} = [1_{4\times 4} \quad 0_{4\times 2}]C_{\phi\_DD\_WL,g}\begin{bmatrix} 1_{4\times 4} \\ 0_{2\times 4} \end{bmatrix}$$

Starting with an estimate of the current position, an iterative Least-Squares algorithm solves for position using the group's 4 measurements. The position is used to form the 4-by-3 system design matrix $H_g = [1_{g,e}^{(1)} \quad 1_{g,e}^{(2)} \quad 1_{g,e}^{(3)} \quad 1_{g,e}^{(4)}]^T$ and the 4-by-1 phase residual vector $z_{\phi,g}$.

A QR factorization of $H_g$ is performed, producing the orthonormal matrices $Q_1$ and $Q_2$ and the upper triangular matrix $R_1$ which verify:

$$H_g = [Q_{1,g} \quad Q_{2,g}]\begin{bmatrix} R_{1,g} \\ 0 \end{bmatrix}$$

The 4-by-1 vector $Q_2$ is used to map the residual vector $z_{\phi,g}$ into the Parity space scalar $\tilde{p}_g$ according to:

$$\tilde{p}_g = (Q_{2,g})^T z_{\phi,g}$$

The scalar $\tilde{p}_g$ will be compared to the expected noise of fault-free measurements in Parity space. The variance $\sigma_{\tilde{p}_g}^2$ of this noise is obtained by projecting the measurement covariance $\tilde{C}_{\phi\_DD\_WL,g}^{fixed}$ (which assumes the fault-free case, since it is conditioned on $\hat{N}_g^{int}$ being correct) into Parity space according to:

$$\sigma_{\tilde{p}_g}^2 = Q_{2,g}^T \tilde{C}_{\phi\_DD\_WL,g}^{fixed} Q_{2,g}$$

The residual test may then be considered as $$|\tilde{p}_g| < K_{res}\sigma_{\tilde{p}_g},$$

where $K_{res}$ is a multiplier determined based on the desired false alarm rate.

If the group passes the test, in some embodiments the probability of missed detections are computed, as detailed below, after discussion of the range test. Otherwise the group is discarded.

In some embodiments the range test uses RAIM or a RAIM-like algorithm to identify if an ambiguity is incorrect in each group. The measurements used in the range monitor are the 3 DD fixed WL phase measurements from the group's SOI (measured from the 3 Rover/Base receiver pairs), along with the candidate integer ambiguity estimates. If the ambiguities are fixed correctly on all these measurements, the residual test statistic will exhibit a statistical distribution consistent with low noise phase measurements.

In some embodiments the range monitor forms two phase differences, with the phase measurement from the group's SOI common to both. These phase differences are compared to a threshold that is derived from the expected fault-free error characteristics. If both tests pass for a particular group, the probability of missed detection of all error states is, in some embodiments, then computed for each of the two differences. Since both tests may be correlated, in some embodiments only the results from the test that provides the lowest probability of missed detection is used for a particular group during the remainder of the processing.

In addition, in most embodiments a correlation between the two residual tests and the range test statistics are reduced or eliminated.

Figure 7:
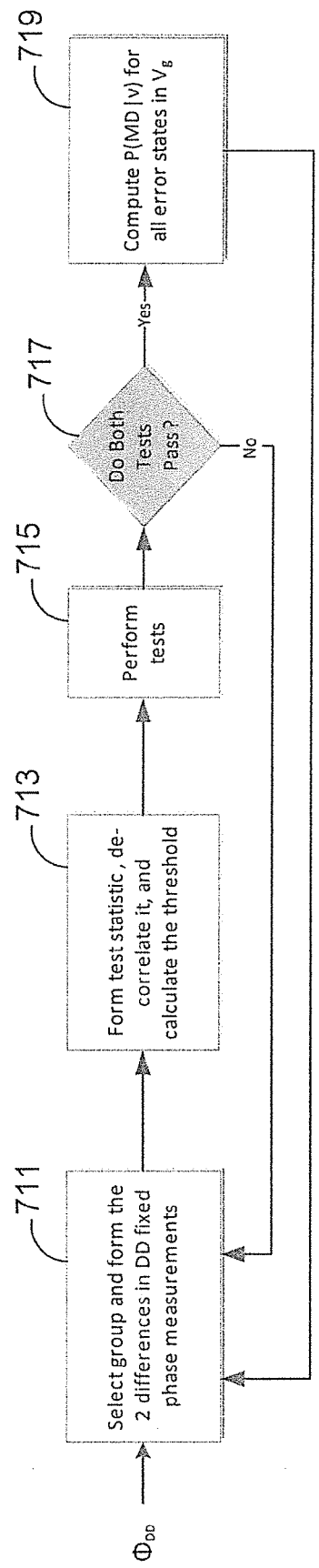
FIG. 7 is a flow diagram of a process that may be used in performing the range test in accordance with aspects of the invention.

FIG. 7 is a flow diagram of a process that may be used in performing the range test. In block 711 a group is selected and differences the phase measurement from the group ROI and the phase measurements from other base receivers are determined. In some embodiments this includes forming DD fixed WL phase measurements, and the corresponding covariance, for the SOI in the group, are formed using the group candidate ambiguity vector in doing so.

In block 713 the covariance matrix of each difference is determined, including a residual test statistic, and each difference is decorrelated from the residual test statistic. In block 715 each difference, which in some embodiments may be two differences, is compared with a threshold, which may be predetermined. In block 717, the process determines if the differences are below the threshold. If not, the process returns to block 711 to process another group. If so, in some embodiments the process continues to block 719 to determine a probability of missed detection for the group. In some embodiments, in block 719 the process maps an error state into a range test space, and calculates a probability of missed detection (PMD). The process thereafter returns to block 711.

In some embodiments the range test forms the following two test quantities:

$$T_{g,ab} = [01 - 1000]\phi_{DD\_WL,g}^{fixed} = \phi_{DD\_WL,g,1b}^{fixed} - \phi_{DD\_WL,g,1a}^{fixed}$$

$$T_{g,ac} = [10 - 1000]\phi_{DD\_WL,g}^{fixed} = \phi_{DD\_WL,g,1c}^{fixed} - \phi_{DD\_WL,g,1a}^{fixed}$$

Conditioned upon $\hat{N}_g^{int}$ being correct, the variance of those quantities is obtained according to:

$$\sigma^2_{T_{g,ab}} = [0\ 1\ -1\ 0\ 0\ 0](C_{\phi\_DD\_WL\_MP,g} + C_{Ba\_Bb\_trans})\begin{bmatrix}0\\1\\-1\\0\\0\\0\end{bmatrix}$$

$$\sigma^2_{T_{g,ac}} = [1\ 0\ -1\ 0\ 0\ 0](C_{\phi\_DD\_WL\_MP,g} + C_{Ba\_Bc\_trans})\begin{bmatrix}1\\0\\-1\\0\\0\\0\end{bmatrix}$$

Atmospheric errors cancel since all Base receivers are near each other, so multipath and translation are the only error sources. Also, there should be no contribution from the Rover receiver, since those terms cancel.

As mentioned before, preferably the range test is independent from the residual test. Preferably, the quantities $T_{g,ab}$ and $T_{g,ac}$ are decorrelated from the residual test quantity $\tilde{p}_g$. These quantities may otherwise be correlated since they both use $\phi_{DD\_WL,g,1a}^{fixed}$. Accordingly, the joint vectors $$x_{g,ab} = \begin{bmatrix}\tilde{p}_g\\T_{g,ab}\end{bmatrix}\ \ x_{g,ac} = \begin{bmatrix}\tilde{p}_g\\T_{g,ac}\end{bmatrix},$$

are formed along with their error covariance matrices $$C_{x_{g,ab}} = \begin{bmatrix}\sigma^2_{\tilde{p}_g} & \sigma^2_{\tilde{p}_g T_{g,ab}}\\ \sigma^2_{\tilde{p}_g T_{g,ab}} & \sigma^2_{T_{g,ab}}\end{bmatrix}\ \ C_{x_{g,ac}} = \begin{bmatrix}\sigma^2_{\tilde{p}_g} & \sigma^2_{\tilde{p}_g T_{g,ac}}\\ \sigma^2_{\tilde{p}_g T_{g,ac}} & \sigma^2_{T_{g,ac}}\end{bmatrix},$$

where $\tilde{p}_g$ and $\sigma^2_{\tilde{p}_g}$ were calculated in the residual test. The residual test quantity can be written:

$$\tilde{p}_g = Q_{2,g}^T z_{\phi,g}$$

$$= Q_{2,g}^T \begin{bmatrix}\phi_{DD\_WL,g,1a}^{fixed} - \therefore\\ \phi_{DD\_WL,g,2a}^{fixed} - \therefore\\ \phi_{DD\_WL,g,3a}^{fixed} - \therefore\\ \phi_{DD\_WL,g,4a}^{fixed} - \therefore\end{bmatrix}$$

where $Q_{2,g}^T$ is from the residual test, and "$\therefore$" stands for the respective predicted phase measurements. Note that $\tilde{p}_g$ does not contain any translation error. The cross-correlation terms can be calculated according to:

$$\sigma^2_{\tilde{p}_g T_{g,ab}} = \langle e_{\tilde{p}_g} e_{T_{g,ab}}\rangle$$

$$= \left\langle Q_{2,g}^T \begin{bmatrix}e_{\phi_{DD\_WL,g,1a}^{fixed}}\\ e_{\phi_{DD\_WL,g,2a}^{fixed}}\\ e_{\phi_{DD\_WL,g,3a}^{fixed}}\\ e_{\phi_{DD\_WL,g,4a}^{fixed}}\end{bmatrix} e_{\phi_{DD\_WL,g,1b}^{fixed} - \phi_{DD\_WL,g,1a}^{fixed}}\right\rangle$$

$$= Q_{2,g}^T \begin{bmatrix}\langle e_{\phi_{DD\_WL,g,1a}^{fixed}} e_{\phi_{DD\_WL,g,1b}^{fixed} - \phi_{DD\_WL,g,1a}^{fixed}}\rangle\\ \langle e_{\phi_{DD\_WL,g,2a}^{fixed}} e_{\phi_{DD\_WL,g,2b}^{fixed} - \phi_{DD\_WL,g,2a}^{fixed}}\rangle\\ \langle e_{\phi_{DD\_WL,g,3a}^{fixed}} e_{\phi_{DD\_WL,g,3b}^{fixed} - \phi_{DD\_WL,g,3a}^{fixed}}\rangle\\ \langle e_{\phi_{DD\_WL,g,4a}^{fixed}} e_{\phi_{DD\_WL,g,4b}^{fixed} - \phi_{DD\_WL,g,4a}^{fixed}}\rangle\end{bmatrix}$$

$$= Q_{2,g}^T \begin{bmatrix}\sigma^2_{\phi\_g,a\_WL\_MP}(\varepsilon_{key}) + \sigma^2_{\phi\_g,a\_WL\_MP}(\varepsilon_{g,1})\\ \sigma^2_{\phi\_g,a\_WL\_MP}(\varepsilon_{key})\\ \sigma^2_{\phi\_g,a\_WL\_MP}(\varepsilon_{key})\\ \sigma^2_{\phi\_g,a\_WL\_MP}(\varepsilon_{key})\end{bmatrix}$$

The notation $e_X$ has been used to denote the error in quantity X. The fourth equality holds because:

1. Only Base multipath errors are common to both error terms, and
2. Multipath from different satellites is assumed uncorrelated, and
3. Multipath from different receivers is assumed uncorrelated Accordingly:

$$\sigma^2_{\tilde{p}_g T_{g,ab}} =$$

$$\sigma^2_{\tilde{p}_g T_{g,ac}} = \sum_{t=1}^{4} Q_{2,g}(t)\sigma^2_{\phi\_g,a\_WL\_MP}(\varepsilon_{key}) + Q_{2,g}(4)\sigma^2_{\phi\_g,a\_WL\_MP}(\varepsilon_{g,1})$$

where $\sigma_{\phi\_g,a\_WL\_MP}^2(\varepsilon_{key})$ and $\sigma_{\phi\_g,a\_WL\_MP}^2(\varepsilon_{g,1})$ are determined from:

$$\sigma^2_{\phi\_X\_WL\_MP}(\varepsilon_j) = \lambda_{WL}^2\left(\frac{\sigma^2_{\phi\_X\_L1\_MP}(\varepsilon_j)}{\lambda_{L1}^2} + \frac{\sigma^2_{\phi\_X\_L2\_MP}(\varepsilon_j)}{\lambda_{L2}^2}\right)$$

With the covariance matrix of the joint vectors $x_{g,ab}$ and $x_{g,ac}$, the range test quantities may be decorrelated from that of the residual test ($\tilde{p}_g$). One may start by diagonalizing $C_{x_{g,ab}}$ and $C_{x_{g,ac}}$:

$$C_{x_{g,ab}} = U_{g,ab}D_{g,ab}U_{g,ab}^T, C_{x_{g,ac}} = U_{g,ac}D_{g,ac}U_{g,ac}^T$$

The joint test quantities $x_{g,ab}$ and $x_{g,ac}$ may be projected into the orthogonalized space, and the component orthogonal to the eigenvector associated with $\tilde{p}_g$ is selected as the decorrelated Range Monitor test quantity:

$$\tilde{T}_{g,ab} = [0\ 1]U_{g,ab}x_{g,ab}^T$$

$$\tilde{T}_{g,ac} = [0\ 1]U_{g,ac}x_{g,ac}^T$$

The corresponding variances are obtained from $D_{ab}$ and $D_{ac}$ according to:

$$\sigma^2_{\hat{T}_{g,ab}} = [0 \ 1] D_{g,ab} \begin{bmatrix} 0 \\ 1 \end{bmatrix}$$

$$\sigma^2_{\hat{T}_{g,ac}} = [0 \ 1] D_{g,ac} \begin{bmatrix} 0 \\ 1 \end{bmatrix}$$

The two range tests are then defined as $$|\hat{T}_{g,ab}| < K_{rng} \sigma_{\hat{T}_{g,ab}}$$

$$|\hat{T}_{g,ac}| < K_{rng} \sigma_{\hat{T}_{g,ac}}$$

where $K_{rng}$ is a multiplier determined based on the desired false alarm rate.

If the group passes both tests, the probability of missed detections are computed in some embodiments, as detailed below. Otherwise the group is discarded.

In some embodiments a probability of missed detection is computed for both the residual test and the range test.

For the residual test, for each predetermined error state v, the error v is mapped into Parity space to obtain its expected mean according to $$\mu_g(v) = Q_{2,g}^T(\lambda_{WL} v),$$

with v was multiplied by $\lambda_{WL}$ to convert to distance. An error will not be expected to be detected by the residual test if $|\hat{\mu}| < K_{res} \sigma_{\hat{P}_g}$. The probability of missed detection is therefore equal to the tails of the corresponding Gaussian distribution that fall outside of the threshold range. Accordingly, $$P(MD_{g,residual} | v) = P(|\hat{\mu}| < K_{res} \sigma_{\hat{P}_g})$$

$$= \frac{1}{2} \left[ \text{erf}\left(\frac{1}{\sqrt{2}}\left(K_{res} + \frac{\mu_g(v)}{\sigma_{\hat{P}_g}}\right)\right) + \text{erf}\left(\frac{1}{\sqrt{2}}\left(K_{res} + \frac{\mu_g(v)}{\sigma_{\hat{P}_g}}\right)\right) \right]$$

For the range test, for each predetermined error state v, the impact of the error state on the cycle residual difference is calculated as:

$$v_{ab} = [01-1000]v$$

$$v_{ac} = [10-1000]v$$

The joint vectors containing $v_{ab}$ and $v_{ac}$ are mapped into the diagonalized space defined by $U_{g,ab}^T$ and $U_{g,ac}^T$ to obtain their expected means according to $$\mu_{g,ab}(v) = [0 \ 1] U_{g,ab}^T \begin{bmatrix} \hat{P}_g \\ \lambda_{WL} v_{ab} \end{bmatrix}$$

$$\mu_{g,ac}(v) = [0 \ 1] U_{g,ac}^T \begin{bmatrix} \hat{P}_g \\ \lambda_{WL} v_{ac} \end{bmatrix}$$

An error will not be expected to be detected in the range test if the realization $\hat{\mu}$ of the error is such that $|\hat{\mu}| K_{rng} \sigma_{\hat{T}_g}$. The probability of missed detection is therefore equal to the tail of the corresponding Gaussian distribution. Since there are two tests (and they are not independent), the test with minimum probability of missed detection is preferably used, with the probability of missed detection for the range test being:

$$P(MD_{g,rang} | v) =$$

$$\frac{1}{2} \min \left\{ \begin{array}{l} \text{erf}\left(\frac{1}{\sqrt{2}}\left(K_{mg} + \frac{\mu_{g,ab}(v)}{\sigma_{\hat{T}_{g,ab}}}\right)\right) + \text{erf}\left(\frac{1}{\sqrt{2}}\left(K_{mg} - \frac{\mu_{g,ab}(v)}{\sigma_{\hat{T}_{g,ab}}}\right)\right) \\ \text{erf}\left(\frac{1}{\sqrt{2}}\left(K_{mg} + \frac{\mu_{g,ac}(v)}{\sigma_{\hat{T}_{g,ac}}}\right)\right) + \text{erf}\left(\frac{1}{\sqrt{2}}\left(K_{mg} - \frac{\mu_{g,ac}(v)}{\sigma_{\hat{T}_{g,ac}}}\right)\right) \end{array} \right\}$$

Returning to FIG. 5, the Widelane Probability of Correct Fix block 515 selects widelane integer ambiguity candidates for use in precision relative navigation solution processing. In many instances multiple widelane integer ambiguity candidates for each satellite/receiver pair may have passed both the residual and range tests. In such instances, the selected widelane integer ambiguity candidate may be selected. In some embodiments the probability of correct fix block 515 selects the widelane integer ambiguity candidate as discussed below.

In some embodiments the probability of missed detection is estimated for each group g according to:

$$P(MD_{WL,g}) = \sum_{v \in V_g} P(MD_{g,residual} | v) P(MD_{g,range} | v) P_g(v) + \alpha PIF_{allocated}$$

$\alpha \ll 1$ and $PIF_{allocated}$ is a predetermined constant based on system safety analysis. Since each satellite/receiver pair is likely to be present in numerous groups as the SOI/ROI pair, the second step is to select one of the groups for each pair. For each pair (m,n) of SOI and ROI, among all the groups g(m,n) that have (m,n) as SOI and ROI, the process selects the one with minimum probability of missed detection:

$$P(MD_{WL,(m,n)}) = \min_{\substack{m \text{ is SOI in } g \\ n \text{ is ROI in } g}} P(MD_{g(m,n)})$$

If the sum of $P(MD_{WL,(m,n)})$ over all satellite/receiver pairs is less than $PIF_{allocated}$, then all the ambiguities can be fixed in the navigation solution and $PCF = 1 - \Sigma_{m,n} P(MD_{WL,(m,n)})$. If that is not the case, only a subset of the ambiguities can be fixed.

In some embodiments the single lane float ambiguity estimation block 517 determines the DD SF float ambiguities using two different methods. A first method may be used when the measurement is of the SOI from the other receivers and a second method may be used when the measurement is from the ROI.

The first method may be considered as geometry-free, and uses the fixed DD WL ambiguities to derive estimates of the float DD SF ambiguities according to:

$$\hat{N}_{DD\_L1} = \frac{\lambda_{WL}}{\lambda_{L1}} \hat{N}_{DD\_WL}^{int} + M_{SD}^{DD} F\left(\frac{\phi_{SD\_L2} - \phi_{SD\_L1}}{\lambda_{L2} - \lambda_{L1}}\right)$$

$$\hat{N}_{DD\_L2} = \frac{\lambda_{WL}}{\lambda_{L2}} \hat{N}_{DD\_WL}^{int} + M_{SD}^{DD} F\left(\frac{\phi_{SD\_L2} - \phi_{SD\_L1}}{\lambda_{L2} - \lambda_{L1}}\right)$$

The measurement $$X(t) = \frac{\phi_{SD_{L2}}(t) - \phi_{SD_{L1}}(t)}{\lambda_{L2} - \lambda_{L1}}$$

may be filtered using a digital low-pass filter (F), for example a Type II filter, designed to attenuate multipath errors and pass through ionospheric errors.

The $3N_{sat}$-by-$3N_{sat}$ covariance matrices of $\hat{N}_{DD\_L1}$ and $\hat{N}_{DD\_L2}$ may be calculated in accordance with the following. As the DD WL integer ambiguities $\hat{N}_{DD\_WL}^{int}$ are assumed correct:

$$C_{\hat{N}_{DD\_L1}} = C_{\hat{N}_{DD\_L2}} = \frac{1}{(\lambda_{L2} - \lambda_{L1})^2} M_{SD}^{DD} C_{SD_{L2-L1}} (M_{SD}^{DD})^T$$

where $$C_{SD_{L2-L1}} = C_{\phi_{filt\_SD\_L1\_MP}} + C_{\phi_{filt\_SD\_L2\_MP}} + C_{\phi_{filt\_SD\_L1L2\_iono}}$$

and $$C_{\phi\_SD\_L1L2\_iono} = \begin{bmatrix} C_{\phi\_iono} & C_{\phi\_iono} & C_{\phi\_iono} \\ C_{\phi\_iono} & C_{\phi\_iono} & C_{\phi\_iono} \\ C_{\phi\_iono} & C_{\phi\_iono} & C_{\phi\_iono} \end{bmatrix}$$

where $$C_{\phi\_iono} = \left(1 - \left(\frac{\lambda_{L2}}{\lambda_{L1}}\right)^2\right)^2 C_{\phi\_SD\_L1\_iono}$$

$$C_{\phi_{filt\_SD\_Y\_MP}} = \begin{bmatrix} C_{\phi_{filt\_SDa\_Y\_MP}} & C_{\phi_{filt\_R\_Y\_MP}} & C_{\phi_{filt\_R\_Y\_MP}} \\ C_{\phi_{filt\_R\_Y\_MP}} & C_{\phi_{filt\_SDb\_Y\_MP}} & C_{\phi_{filt\_R\_Y\_MP}} \\ C_{\phi_{filt\_R\_Y\_MP}} & C_{\phi_{filt\_R\_Y\_MP}} & C_{\phi_{filt\_SDc\_Y\_MP}} \end{bmatrix}$$

where $$C_{\phi_{filt\_SDx\_Y\_MP}} = C_{\phi_{filt\_Bx\_Y\_MP}} + C_{\phi_{filt\_R\_Y\_MP}}$$

and $$C_{\phi_{filt\_X\_Y\_MP}} = \text{diag}\left[\sigma^2_{\phi_{filt\_X\_Y\_MP}}(\varepsilon_1), \ldots, \sigma^2_{\phi_{filt\_X\_Y\_MP}}(\varepsilon_{N_{sat}})\right]$$

The second method may be considered geometry constrained. The measurement vector may be formed by combining the fixed DD WL phase measurements $\phi_{DD\_WL}^{fixed}$ and the float DD SF (Y) phase measurements:

$$\phi_{DD\_Y}^{meas} = \begin{bmatrix} \phi_{DD\_WL}^{fixed} \\ \phi_{DD\_Y} \end{bmatrix}$$

This quantity has covariance $$C_{\phi_{DD\_Y}^{meas}},$$

and may make use of a predicted vector $\phi_{DD\_Y}^{predict}$, which uses the current aircraft position and satellite ephemeris to compute the expected fixed phase measurement and adds the current estimate of ambiguities:

$$\phi_{DD\_Y}^{predict} = \begin{bmatrix} \phi_{DD\_WL}^{fixed, expected} \\ \phi_{DD\_Y}^{fixed, expected} \end{bmatrix} + \begin{bmatrix} 0 \\ \lambda_Y \hat{N}_{DD\_Y} \end{bmatrix}$$

Assuming the fixed ambiguities are correct, the error in this predicted phase vector can be related to errors in position ($\delta x$) and to the float ambiguities according to:

$$\phi_{DD_Y}^{predict} = H_{LOS}\delta x + \lambda_Y \begin{bmatrix} 0_{N_{fixed} \times 1} \\ \hat{N}_{DD_Y} \end{bmatrix}$$

$$= \underbrace{\begin{bmatrix} H_{LOS} & 0_{N_{fixed} \times N_{EAE}} \\ & I_{N_{EAE} \times N_{EAE}} \end{bmatrix}}_{H_{EAE}} \begin{bmatrix} \delta x \\ \lambda_Y \hat{N}_{DD\_Y} \end{bmatrix}$$

This may be solved using an iterative Weighted Least Squares method:

$$X = \left(H_{EAE}^T C_{\phi_{DD_Y}^{meas}}^{-1} H_{EAE}\right)^{-1} H_{EAE}^T C_{\phi_{DD_Y}^{meas}}^{-1} \left(\phi_{DD_Y}^{meas} - \phi_{DD_Y}^{predict}\right)$$

$$\hat{N}_{DD_Y} = \frac{X(N_{fixed} + 1:N_{Sat})}{\lambda_Y}$$

$$C_X = \left(H_{EAE}^T C_{\phi_{DD_Y}^{meas}}^{-1} H_{EAE}\right)^{-1}$$

$$C_{\hat{N}_{DD\_Y}} = \left(\frac{1}{\lambda_Y}\right)^2 C_X(N_{fixed} + 1:N_{Sat}, N_{fixed} + 1:N_{Sat})$$

In some embodiments the single lane integer ambiguity estimation block 519 performs a Bootstrapping process to obtain candidate integer ambiguities. The candidate integer ambiguities for each group g of interest are $\hat{N}_{L1,g}^{int}$ and $\hat{N}_{L2,g}^{int}$. The candidate DD SF fixed measurements are then given by $$\phi_{DD\_L1,g}^{fixed} = \phi_{DD\_L1,g} - \lambda_{L1} \hat{N}_{L1,g}^{int}$$

$$\phi_{DD\_L2,g}^{fixed} = \phi_{DD\_L2,g} - \lambda_{L2} \hat{N}_{L2,g}^{int}$$

The covariance of these quantities may be obtained according to:

$$C_{\phi\_DD\_Y,g}^{fixed} = C_{\phi_{DD\_Y,g}}$$

In some embodiments the single lane integer ambiguity verification block 521 forms residual and first range test statistics, decorrelates the test statistics from one another and the candidate single lane integer ambiguities, and performs the residual test and the first range test. In some embodiments, for groups that pass the tests, a second range test statistic is formed, the residual and second range test statistics are decorrelated from one another and the candidate single lane integer ambiguities, and the residual test and the second range test are also performed. In some embodiments probabilities of missed detection are also determined.

In some embodiments the first range test statistic is $$T_{Y,g,ab} = [01-1000]\phi_{DD\_Y,g}^{fixed} = \phi_{DD\_Y,g,1b}^{fixed} - \phi_{DD\_Y,g,1a}^{fixed}$$

$$T_{Y,g,ac} = [01-1001]\phi_{DD\_Y,g}^{fixed} = \phi_{DD\_Y,g,1c}^{fixed} - \phi_{DD\_Y,g,1a}^{fixed}$$

With the variance of those quantities is obtained according to:

$$\sigma^2_{T_{Y,g,ab}} = [0 \ 1 \ -1 \ 0 \ 0 \ 0](C_{\phi\_DD\_Y\_MP,g} + C_{Ba\_Bb\_trans}) \begin{bmatrix} 0 \\ 1 \\ -1 \\ 0 \\ 0 \\ 0 \end{bmatrix}$$

$$\sigma^2_{T_{Y,g,ac}} = [1 \ 0 \ -1 \ 0 \ 0 \ 0](C_{\phi\_DD\_Y\_MP,g} + C_{Ba\_Bc\_trans}) \begin{bmatrix} 1 \\ 0 \\ -1 \\ 0 \\ 0 \\ 0 \end{bmatrix}$$

In some embodiments the second range test statistic is $$X_{Y,g}(t) = \phi_{DD\_WL,g,1a}^{fixed}(t) - \phi_{DD\_Y,g,1a}^{fixed}(t)$$

The measurement $X_{Y,g}(t)$ may be filtered using a Type II low-pass digital filter.

In some embodiments the single lane probability of correct fix block 523 operates as discussed above with respect to the widelane probability of correct fix block.

Although the invention has been discussed with respect to various embodiments, it should be recognized that the invention comprises the novel and non-obvious claims supported by this disclosure.

What is claimed is:

1. A method, performed by circuitry including at least one processor, of determining integer ambiguities for relative position determination of a mobile vehicle using satellite provided data, comprising:
   receiving, from at least one of a plurality of GPS satellites, satellite data relating to position by at least one GPS receiver;
   operating the at least one processor to perform measurement processing using the satellite data relating to position, to obtain float ambiguity estimates;
   operating the at least one processor to determine groups of candidate integer ambiguities, each of the groups including candidate integer ambiguity for a plurality of receivers and satellites;
   for each of the groups, performing a plurality of tests by the at least one processor to determine whether the candidate integer ambiguities for the group exhibits a statistical distribution consistent with low noise phase measurements, the tests comprising a first test measuring consistency between measurements with respect to information received from the plurality of GPS satellites and a pair of GPS receivers, and a second test measuring consistency between measurements with respect to information received from a single GPS satellite and a plurality of pairs of GPS receivers, the first test and the second test being decorrelated from one another; and
   selecting, from among the candidate integer ambiguities which exhibit the statistical distribution consistent with low noise phase measurements, a candidate integer ambiguity for use in determining relative position of the mobile vehicle.

2. The method of claim 1, wherein the test measuring consistency between measurements with respect to information received from the plurality of satellites and the pair of receivers comprises a residual test.

3. The method of claim 1, wherein the tests measuring consistency between measurements with respect to information received from the single satellite and the plurality of pairs of receivers comprises a range test.

4. A method, performed by circuitry in a mobile vehicle, useful in determining relative position of mobile vehicle having a receiver, using information from a plurality of satellites and a plurality of base receivers, comprising:
   receiving position related information from a plurality of satellites;
   receiving further position related information from each of the plurality of base receivers;
   determining double-differenced widelane float ambiguity estimates, and their associated covariance matrices, for a plurality of pairs, each pair including the mobile vehicle and a different base receiver based on the position related information and the further position related information;
   determining groups of candidate widelane integer ambiguities and their associated covariance matrices, each of the groups being for a receiver of interest and a satellite of interest, each group including candidate widelane integer ambiguities for the receiver of interest and each of the plurality of satellites, including the satellite of interest, and candidate widelane integer ambiguities for at least some other receivers and the satellite of interest;
   performing a first test to determine, for at least one group, on a mobile vehicle/base receiver pair basis for the plurality of satellites, if the candidate widelane integer ambiguities exhibit a statistical distribution consistent with low noise phase measurements;
   performing a second test to determine, for at least one group, on a single satellite basis for a plurality of mobile vehicle/base receiver pairs, if the candidate widelane integer ambiguities exhibit a statistical distribution consistent with low noise phase measurements; and
   selecting, from among the candidate widelane integer ambiguities, a widelane integer ambiguity for use in determining relative position of the mobile vehicle.

5. The method of claim 4, wherein the first test and the second test are decorrelated from one another.

6. The method of claim 4, wherein the first test and the second test are performed for all groups.

7. The method of claim 4, further comprising:
   determining single frequency float ambiguities using the selected widelane integer ambiguity.

8. The method of claim 7, further comprising:
   determining groups of candidate single frequency integer ambiguities and their associated covariance matrices, each of the groups being for a receiver of interest and a satellite of interest, each group including candidate single frequency integer ambiguities for the receiver of interest and each of the plurality of satellites, including the satellite of interest, and candidate single frequency integer ambiguities for at least some other receivers and the satellite of interest;

performing the first test to determine, for at least one group, on a mobile vehicle/base receiver pair basis for the plurality of satellites, if the candidate single frequency integer ambiguities exhibit a statistical distribution consistent with low noise phase measurements;

performing the second test to determine, for at least one group, on a single satellite basis for a plurality of mobile vehicle/base receiver pairs, if the candidate single frequency integer ambiguities exhibit a statistical distribution consistent with low noise phase measurements; and selecting, from among the candidate single frequency integer ambiguities, a single frequency integer ambiguity for use in determining relative position of the mobile vehicle.

9. A system for determining relative position of a rover, comprising:
a data link;
a global positioning system (GPS) receiver;
a processor coupled to the data link and GPS receiver, the processor configured by program instructions, to:

determine double differenced float ambiguity estimates and a float ambiguity covariance matrix based on information from the GPS receiver and information from other GPS receivers received by way of the data link;

determine groups of integer ambiguity estimates and their covariance matrices;

perform a first test to determine for each group, on a pairs of the GPS receivers basis for satellites in view of those GPS receivers, if the integer ambiguity estimates exhibit a statistical distribution consistent with low noise phase measurements;

perform a second test to determine for each group, on a single satellite basis for pairs of GPS receiver, if the integer ambiguity estimates exhibit a statistical distribution consistent with low noise phase measurements; and select a one of the integer ambiguity estimates that has passed both the first test and the second test for use in navigation position functions.

* * * * *

UNITED STATES PATENT AND TRADEMARK OFFICE
CERTIFICATE OF CORRECTION

PATENT NO. : 9,817,129 B2
APPLICATION NO. : 14/507545
DATED : November 14, 2017
INVENTOR(S) : Joseph Henry Hansen, Jr. et al.

Page 1 of 1

It is certified that error appears in the above-identified patent and that said Letters Patent is hereby corrected as shown below:

In Column 5, Line 11, delete "of" and insert -- of, --, therefor.

In Column 9, Line 25, after "integer" delete "i".

In Column 11, Line 65, delete "$\tilde{p}_g = Q_{2,g}^T Z_{\phi,g}$" and insert -- $\tilde{p}_g = Q_{2,g}^T Z_\phi g$ --, therefor.

In Column 12, Line 5, delete "$\tau_{\tilde{p}_g}^2 = Q_{2,g}^T \tilde{C}_{\phi\_DD\_WL,g}^{fixed} Q_{2,g}$" and insert -- $\sigma_{\tilde{p}_g}^2 = Q_{2,g}^T \tilde{C}_{\phi\_DD\_WL,g}^{fixed} Q_{2,g}$ --, therefor.

In Column 16, Lines 40-41, delete "$P(MD_{WL,(m,n)}) = \min_{m \text{ is SOI in } g, n \text{ is ROI in } g} P(MD_{g(m,n)})$" and insert -- $P(MD_{WL,(m,n)}) = \min_{m \text{ is SOI in } g, n \text{ is ROI in } g} P(MD_{g(m,n)})$ --, therefor.

In Column 19, Line 52, in Claim 1, delete "processing" and insert -- processing, --, therefor.

Signed and Sealed this
Third Day of July, 2018

Andrei Iancu
*Director of the United States Patent and Trademark Office*